US012519709B2

(12) United States Patent
Singh et al.

(10) Patent No.: US 12,519,709 B2
(45) Date of Patent: Jan. 6, 2026

(54) APPARATUSES, METHODS, AND COMPUTER PROGRAMS FOR EXCHANGING ANALYTICS DATA

(71) Applicant: NOKIA TECHNOLOGIES OY, Espoo (FI)

(72) Inventors: Shubhranshu Singh, Seeheim (DE); Yannick Lair, Voisins le Bretonneux (FR); Laurent Thiebaut, Antony (FR); Saurabh Khare, Bangalore (IN); Anja Jerichow, Grafing (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 390 days.

(21) Appl. No.: 18/021,070

(22) PCT Filed: Aug. 11, 2020

(86) PCT No.: PCT/EP2020/072450
§ 371 (c)(1),
(2) Date: Feb. 13, 2023

(87) PCT Pub. No.: WO2022/033660
PCT Pub. Date: Feb. 17, 2022

(65) Prior Publication Data
US 2023/0327966 A1  Oct. 12, 2023

(51) Int. Cl.
*H04L 12/00* (2006.01)
*H04L 43/04* (2022.01)
*H04L 43/062* (2022.01)

(52) U.S. Cl.
CPC ............ *H04L 43/062* (2013.01); *H04L 43/04* (2013.01)

(58) Field of Classification Search
CPC ....... H04L 43/062; H04L 43/04; H04L 43/12; H04L 41/142; H04W 4/50; H04W 8/08; H04W 8/16; H04W 36/0033
USPC ........................................................ 370/329
See application file for complete search history.

(56) References Cited

U.S. PATENT DOCUMENTS

| | | | |
|---|---|---|---|
| 11,463,978 B2* | 10/2022 | Ianev | H04W 24/08 |
| 11,936,534 B2* | 3/2024 | Fan | H04L 41/0816 |
| 2014/0304301 A1* | 10/2014 | Reavis | G06F 40/134 |
| | | | 707/771 |
| 2020/0218715 A1 | 7/2020 | Chen et al. | |
| 2020/0244557 A1 | 7/2020 | Nie et al. | |
| 2021/0250251 A1* | 8/2021 | Fan | H04L 41/14 |
| 2021/0345158 A1* | 11/2021 | Puente Pestaña | H04L 41/052 |

(Continued)

FOREIGN PATENT DOCUMENTS

| | | |
|---|---|---|
| WO | 2019/219173 A1 | 11/2019 |
| WO | 2020/083266 A1 | 4/2020 |

OTHER PUBLICATIONS

International Search Report & Written Opinion dated Mar. 16, 2021 corresponding to International Patent Application No. PCT/EP2020/072450.

(Continued)

*Primary Examiner* — Frantz Coby
(74) *Attorney, Agent, or Firm* — Barta Jones, PLLC

(57) ABSTRACT

There is disclosed a network apparatus that is caused to receive analytics data from a first network apparatus, determine that said analytics data is usable by a second network apparatus, and send said analytics data to the second network apparatus in dependence on said determining.

4 Claims, 13 Drawing Sheets

(56) References Cited

U.S. PATENT DOCUMENTS

| | | | |
|---|---|---|---|
| 2022/0039046 A1* | 2/2022 | Ianev | H04W 60/00 |
| 2022/0070702 A1* | 3/2022 | Puente Pestaña | H04L 43/065 |
| 2023/0117382 A1* | 4/2023 | Zhang | H04L 41/14 709/224 |
| 2023/0153685 A1* | 5/2023 | Puente Pestaña | G06N 20/00 706/12 |

OTHER PUBLICATIONS

Nokia et al., "Corrections for analytics exposure framework related parameters," 3GPP Draft; S2-1908038—Rev of S2-1907674, SA WG2 Meeting #134, Jun. 24-28, 2019, Sapporo, Japan, Jun. 27, 2019, XP051756654.

3GPP TS 23.288 V16.4.0 (Jul. 2020), Technical Specification, 3rd Generation Partnership Project; Technical Specification Group Services and System Aspects; Architecture enhancements for 5G System (5GS) to support network data analytics services (Release 16), Jul. 2020.

3GPP TS 23.501 V16.5.0 (Jul. 2020), Technical Specification, 3rd Generation Partnership Project; Technical Specification Group Services and System Aspects; System architecture for the 5G System (5GS); Stage 2 (Release 16), Jul. 2020.

3GPP TS 23.502 V16.5.0 (Jul. 2020), Technical Specification, 3rd Generation Partnership Project; Technical Specification Group Services and System Aspects; Procedures for the 5G System (5GS); Stage 2 (Release 16), Jul. 2020.

3GPP TS 29.504 V16.4.0 (Jun. 2020), Technical Specification, 3rd Generation Partnership Project; Technical Specification Group Core Network and Terminals; 5G System; Unified Data Repository Services; Stage 3 (Release 16), Jun. 2020.

3GPP TS 29.505 V16.3.0 (Jun. 2020), Technical Specification, 3rd Generation Partnership Project; Technical Specification Group Core Network and Terminals; 5G System; Usage of the Unified Data Repository services for Subscription Data; Stage 3 (Release 16), Jun. 2020.

3GPP TS 29.510 V16.4.0 (Jul. 2020), Technical Specification, 3rd Generation Partnership Project; Technical Specification Group Core Network and Terminals; 5G System; Network Function Repository Services; Stage 3 (Release 16), Jul. 2020.

* cited by examiner

APPARATUSES, METHODS, AND COMPUTER PROGRAMS FOR EXCHANGING ANALYTICS DATA

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

STATEMENT OF INVENTION

According to a first aspect, there is provided a network apparatus comprising: means for receiving analytics data from a first network apparatus; means for determining that said analytics data is usable by a second network apparatus; and means for sending said analytics data to the second network apparatus in dependence on said means for determining.

Said means for determining may comprise means for receiving an indication from the second network apparatus indicating that said analytics data is usable by the second network apparatus.

The analytics data may relate to at least one terminal, and said means for determining may comprise means for determining that the second network apparatus is or will be providing at least one service to the at least one terminal.

Said means for determining may comprise means for receiving an indication of a willingness to receive said analytics data from the second network apparatus.

Said means for determining may comprise means for accessing a network profile of said second network apparatus that indicates that said second network apparatus can receive said analytics data.

Said means for determining may comprise determining a signalling mechanism through which to send the analytics data to the second network apparatus and the means for sending may comprise sending the analytics information to the second network apparatus in dependence on said signalling mechanism.

The analytics data may comprise information indicating a freshness and/or a validity of analytics information comprised within the analytics data.

The analytics data may be comprised within signalling for a network process having a function other than providing the analytics data.

According to a second aspect, there is provided a network apparatus comprising means for receiving analytics data from a first network apparatus that did not generate said analytics data.

The network apparatus may further comprise means for indicating that the network apparatus can receive analytics data from the first network apparatus. The means for indicating may comprise means for creating and/or updating a profile stored in a second network apparatus to indicate that the network apparatus can receive said analytics data. The means for indicating may comprise means for sending to the first network apparatus an indication of a willingness to receive said analytics data. The means for indicating may further comprise means for indicating through which signalling messages the network apparatus is able to receive said analytics data.

The analytics data may comprise information indicating a freshness and/or a validity of analytics information comprised within the analytics data.

The analytics data may be comprised within signalling for a network process having a function other than providing the analytics data.

According to a third aspect, there is provided a network apparatus comprising: at least one processor; and at least one memory comprising code that, when executed by the at least one processor, causes the network apparatus to: receive analytics data from a first network apparatus; determine that said analytics data is usable by a second network apparatus; and send said analytics data to the second network apparatus in dependence on said determining.

Said determining may comprise receiving an indication from the second network apparatus indicating that said analytics data is usable by the second network apparatus.

The analytics data may relate to at least one terminal, and said determining may comprise determining that the second network apparatus is or will be providing at least one service to the at least one terminal.

Said determining may comprise receiving an indication of a willingness to receive said analytics data from the second network apparatus.

Said determining may comprise accessing a network profile of said second network apparatus that indicates that said second network apparatus can receive said analytics data.

Said determining may comprise determining a signalling mechanism through which to send the analytics data to the second network apparatus and the sending may comprise sending the analytics information to the second network apparatus in dependence on said signalling mechanism.

The analytics data may comprise information indicating a freshness and/or a validity of analytics information comprised within the analytics data.

The analytics data may be comprised within signalling for a network process having a function other than providing the analytics data.

According to a fourth aspect, there is provided a network apparatus comprising: at least one processor; and at least one memory comprising code that, when executed by the at least one processor, causes the network apparatus to: receive analytics data from a first network apparatus that did not generate said analytics data.

The network apparatus may further be caused to indicate that the network apparatus can receive analytics data from the first network apparatus. The indicating may comprise creating and/or updating a profile stored in a second network apparatus to indicate that the network apparatus can receive said analytics data. The indicating may comprise sending to the first network apparatus an indication of a willingness to receive said analytics data. The indicating may further comprise indicating through which signalling messages the network apparatus is able to receive said analytics data.

The analytics data may comprise information indicating a freshness and/or a validity of analytics information comprised within the analytics data.

The analytics data may be comprised within signalling for a network process having a function other than providing the analytics data.

According to a fifth aspect, there is provided a method for a network apparatus, the method comprising: receiving analytics data from a first network apparatus; determining that said analytics data is usable by a second network apparatus; and sending said analytics data to the second network apparatus in dependence on said determining.

Said determining may comprise receiving an indication from the second network apparatus indicating that said analytics data is usable by the second network apparatus.

The analytics data may relate to at least one terminal, and said determining may comprise determining that the second network apparatus is or will be providing at least one service to the at least one terminal.

Said determining may comprise receiving an indication of a willingness to receive said analytics data from the second network apparatus.

Said determining may comprise accessing a network profile of said second network apparatus that indicates that said second network apparatus can receive said analytics data.

Said determining may comprise determining a signalling mechanism through which to send the analytics data to the second network apparatus and the sending may comprise sending the analytics information to the second network apparatus in dependence on said signalling mechanism.

The analytics data may comprise information indicating a freshness and/or a validity of analytics information comprised within the analytics data.

The analytics data may be comprised within signalling for a network process having a function other than providing the analytics data.

According to a sixth aspect, there is provided a method for a network apparatus, the method comprising: receiving analytics data from a first network apparatus that did not generate said analytics data.

The method may further comprise indicating that the network apparatus can receive analytics data from the first network apparatus. The indicating may comprise creating and/or updating a profile stored in a second network apparatus to indicate that the network apparatus can receive said analytics data. The indicating may comprise sending to the first network apparatus an indication of a willingness to receive said analytics data. The indicating may further comprise indicating through which signalling messages the network apparatus is able to receive said analytics data.

The analytics data may comprise information indicating a freshness and/or a validity of analytics information comprised within the analytics data.

The analytics data may be comprised within signalling for a network process having a function other than providing the analytics data.

According to a seventh aspect, there is provided a network apparatus comprising: receiving circuitry for receiving analytics data from a first network apparatus; determining circuitry for determining that said analytics data is usable by a second network apparatus; and sending circuitry for sending said analytics data to the second network apparatus in dependence on said determining circuitry.

Said means for determining may comprise means for receiving an indication from the second network apparatus indicating that said analytics data is usable by the second network apparatus.

The analytics data may relate to at least one terminal, and said determining circuitry for determining may comprise circuitry for determining that the second network apparatus is or will be providing at least one service to the at least one terminal.

Said determining circuitry for determining may comprise receiving circuitry for receiving an indication of a willingness to receive said analytics data from the second network apparatus.

Said determining circuitry for determining may comprise accessing circuitry for accessing a network profile of said second network apparatus that indicates that said second network apparatus can receive said analytics data.

Said determining circuitry for determining may comprise determining a signalling mechanism through which to send the analytics data to the second network apparatus and the sending circuitry for sending may comprise circuitry for sending the analytics information to the second network apparatus in dependence on said signalling mechanism.

The analytics data may comprise information indicating a freshness and/or a validity of analytics information comprised within the analytics data.

The analytics data may be comprised within signalling for a network process having a function other than providing the analytics data.

According to an eighth aspect, there is provided a network apparatus comprising receiving circuitry for receiving analytics data from a first network apparatus that did not generate said analytics data.

The network apparatus may further comprise indicating circuitry for indicating that the network apparatus can receive analytics data from the first network apparatus. The indicating circuitry for indicating may comprise creating circuitry for creating and/or updating a profile stored in a second network apparatus to indicate that the network apparatus can receive said analytics data. The indicating circuitry for indicating may comprise sending to the first network apparatus an indication of a willingness to receive said analytics data. The indicating circuitry for indicating may further comprise indicating circuitry for indicating through which signalling messages the network apparatus is able to receive said analytics data.

The analytics data may comprise information indicating a freshness and/or a validity of analytics information comprised within the analytics data.

The analytics data may be comprised within signalling for a network process having a function other than providing the analytics data.

According to a ninth aspect, there is provided non-transitory computer readable medium comprising program instructions for causing a network apparatus to perform at least the following: receive analytics data from a first network apparatus; determine that said analytics data is usable by a second network apparatus; and send said analytics data to the second network apparatus in dependence on said determining.

Said determining may comprise receiving an indication from the second network apparatus indicating that said analytics data is usable by the second network apparatus.

The analytics data may relate to at least one terminal, and said determining may comprise determining that the second network apparatus is or will be providing at least one service to the at least one terminal.

Said determining may comprise receiving an indication of a willingness to receive said analytics data from the second network apparatus.

Said determining may comprise accessing a network profile of said second network apparatus that indicates that said second network apparatus can receive said analytics data.

Said determining may comprise determining a signalling mechanism through which to send the analytics data to the second network apparatus and the sending may comprise sending the analytics information to the second network apparatus in dependence on said signalling mechanism.

The analytics data may comprise information indicating a freshness and/or a validity of analytics information comprised within the analytics data.

The analytics data may be comprised within signalling for a network process having a function other than providing the analytics data.

According to a tenth aspect, there i is provided non-transitory computer readable medium comprising program instructions for causing a network apparatus to perform at least the following: receive analytics data from a first network apparatus that did not generate said analytics data.

The network apparatus may further be caused to indicate that the network apparatus can receive analytics data from the first network apparatus. The indicating may comprise creating and/or updating a profile stored in a second network apparatus to indicate that the network apparatus can receive said analytics data. The indicating may comprise sending to the first network apparatus an indication of a willingness to receive said analytics data. The indicating may further comprise indicating through which signalling messages the network apparatus is able to receive said analytics data.

The analytics data may comprise information indicating a freshness and/or a validity of analytics information comprised within the analytics data.

The analytics data may be comprised within signalling for a network process having a function other than providing the analytics data.

According to an eleventh aspect, there is provided a computer program comprising program instructions for causing a computer to perform any method as described above.

According to a twelfth aspect, there is provided a computer program product stored on a medium may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

In the above, many different aspects have been described. It should be appreciated that further aspects may be provided by the combination of any two or more of the aspects described above.

Various other aspects are also described in the following detailed description and in the attached claims.

BRIEF DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system is briefly explained with reference to FIG. 1.

Figure 1:
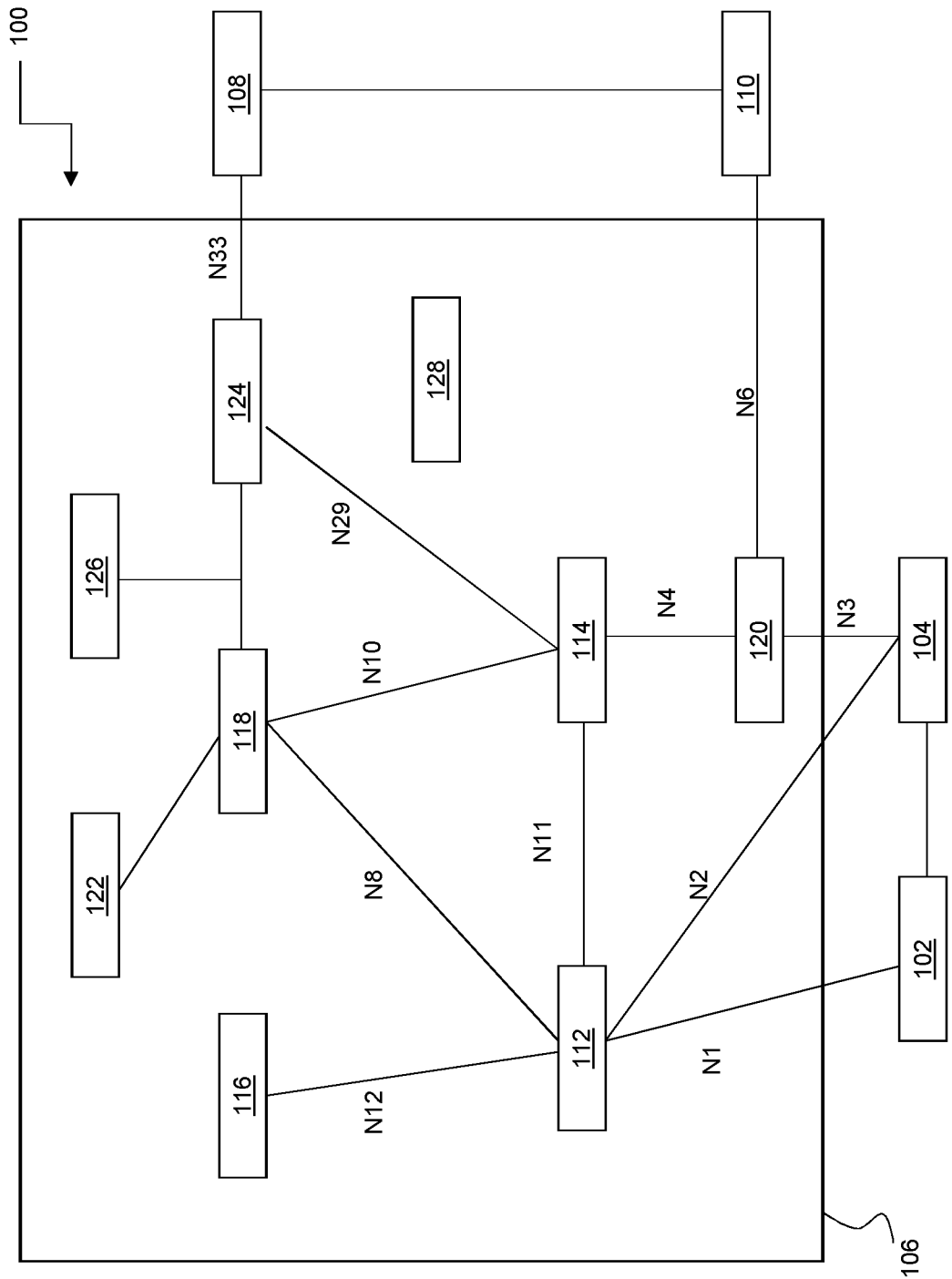
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (GNB) distributed unit functions connected to one or more gNodeB (GNB) centralized unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more policy control (PCF) functions 128, and/or one or more network exposure functions (NEF) 124. Although PCF 128 is not depicted with its interfaces, it is understood that this is for clarity reasons and that PCF 126 may have a plurality of interfaces with other network functions, such as AMF 112 (via interface N15), SMF 114 (via interface N7), UDR 122 (through interface N36), network data analytics function (NWDAF) 126 (through interface N23), and many other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

As examples of some of the other functions provided by a NWDAF, it is noted that the NWDAF may retrieve information from data repositories (e.g. UDR via UDM for subscriber-related information). The NWDAF may discover information about different network functions (e.g. from NRF for NF-related information). 3GPP Technical Specification TS 23.288 also allows for an NWDAF to provide on-demand analytics to consumers. Under current specifications, each NF interested in analytics for a UE or a group of UEs may request analytics specifically for its sole own benefit from an NWDAF.

Figure 2A:
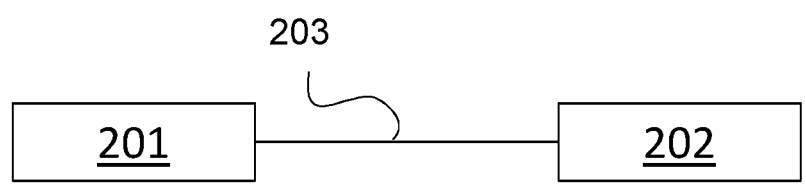
FIGS. 2A and 2B show schematic representations of a network function interacting with a network analytics function.
Figure 2B:
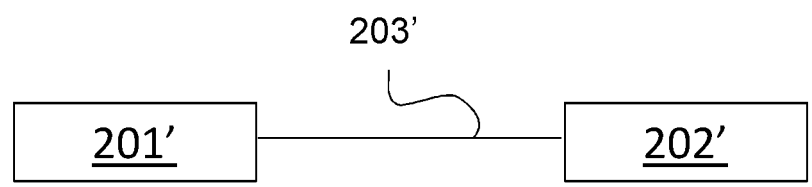

The currently defined architecture for this is illustrated with respect to FIGS. 2A and 2B.

FIG. 2A shows an NWDAF 201 configured to collect data from a network function 202 over an interface 203. The interface may be an Nnf interface in accordance with the 5GC specified in Rel-15 and Rel-16, or in accordance with equivalent interfaces in other networks and later releases. The network function may be any 5GC function. For example, the network function may be any of an AMF, an SMF, a Policy Control Function (PCF), and a UDM. The network function may be any of an Application Function (either directly or via an NEF), and an Operations and Management (OAM) function. The data collection may be performed based on at least one subscription to the events provided by the at least one network function.

FIG. 2B shows an NWDAF 201' configured to send network analytic information to a network function 202' over an interface 203'. The interface may be an Nnwdaf interface in accordance with the 5GC specified in Rel-15 and Rel-16, or in accordance with equivalent interfaces in other networks and later releases. The network function may be any defined network function. The network function may be any 5GC function. For example, the network function may be an AMF, an SMF, a PCF, and a UDM. The network function may be an Application Function (either directly or via an NEF), and an OAM function.

Currently work is being performed on 3GPP Release-17. This work includes various enhancements to current NWDAF functionalities. Some of them are documented in 3GPP TR 23.700 v0.4.0

For example, one current proposal is to co-locate NWDAF functionalities as NWDAF instances with a 5GC NF. In such a case, a co-located NWDAF would perform analytics without the current need to discover and select an NWDAF. Similarly, there is no need for such a co-located NWDAF instance to discover the NF serving the UE as this functionality is integrated with the NF. For example, an NWDAF instance collocated with an AMF may perform analytics for a UE registered in that AMF and take actions for risk solving. These actions may focus on targeting AMF and UE mobility patterns.

The analytics are kept in the co-located NWDAF, unless it is uploaded and/or sent to some other network functions, such as a central NWDAF for coordinating the analytics transfer. This means that, when a UE is moving, the analytics may be lost for the UE as soon as the UE moves to a different AMF unless transferred to a central/non-co-located NWDAF. Moreover, although 3GPP Release-15 and Release-16 specifications (e.g. TS 23.501 and TS 23.502 V16.5.0) define multiple procedures relating to such as registration (inter-AMF mobility), and Hand-over (inter-SMF mobility), these specifications are silent on what happens to any available NWDAF analytics during these times.

In light of the above, the following proposes a mechanism that allows a network function to send network analytic information it has received from an NWDAF to another network function. In other words, a non-NWDAF network entity sends NWDAF analytics to another non-NWDAF network entity. The receiving non-NWDAF network entity thus receives the NWDAF analytics over an interface that does not connect to an NWDAF. This sending may be performed autonomously, without a request from the another network function for this information. In such a case, the network function sending the network analytic information may proactively determine that at least one other network function would be likely to use/want the information, and proactively send it to the at least one other network function. The sending may be performed in response to an explicit indication of willingness to receive this information from the at least one other network function. The sending may be performed in response to an implicit indication of willingness to receive this information, such as a network function profile for the another network function indicating that such analytics information can be received by the another network function. Any indication (whether implicit or explicit) may also indicate at least one signalling mechanism by which the analytics information may be sent. The sending may be performed as part of some existing procedure, such as the following procedures: UE Mobility, PDU session establishment, PDU session update procedures, SM and AM policy association procedures, NF registration/deregistration onto UDM/UDR, and so on.

The following provides several specific examples of how such mechanisms may be deployed in currently defined networks. For clarity, the following will consider cases in which the information specifically relates to at least one UE, such as UE mobility, UE Communication pattern analytics, UE behaviour info (e.g. downlink/uplink traffic pattern, etc.). However, it is understood that the following is not limited to only considering UE-specific network analytic information, and any network analytic information may be distributed as described herein.

As a first example, a case is considered in which UE mobility analytics and/or communication analytics, such as UE behaviour info (e.g. downlink/uplink traffic pattern, etc.) may be transferred from a source AMF to a target AMF, together with UE Context transfer messages as part of a Mobility Registration Update procedure.

Figure 3:
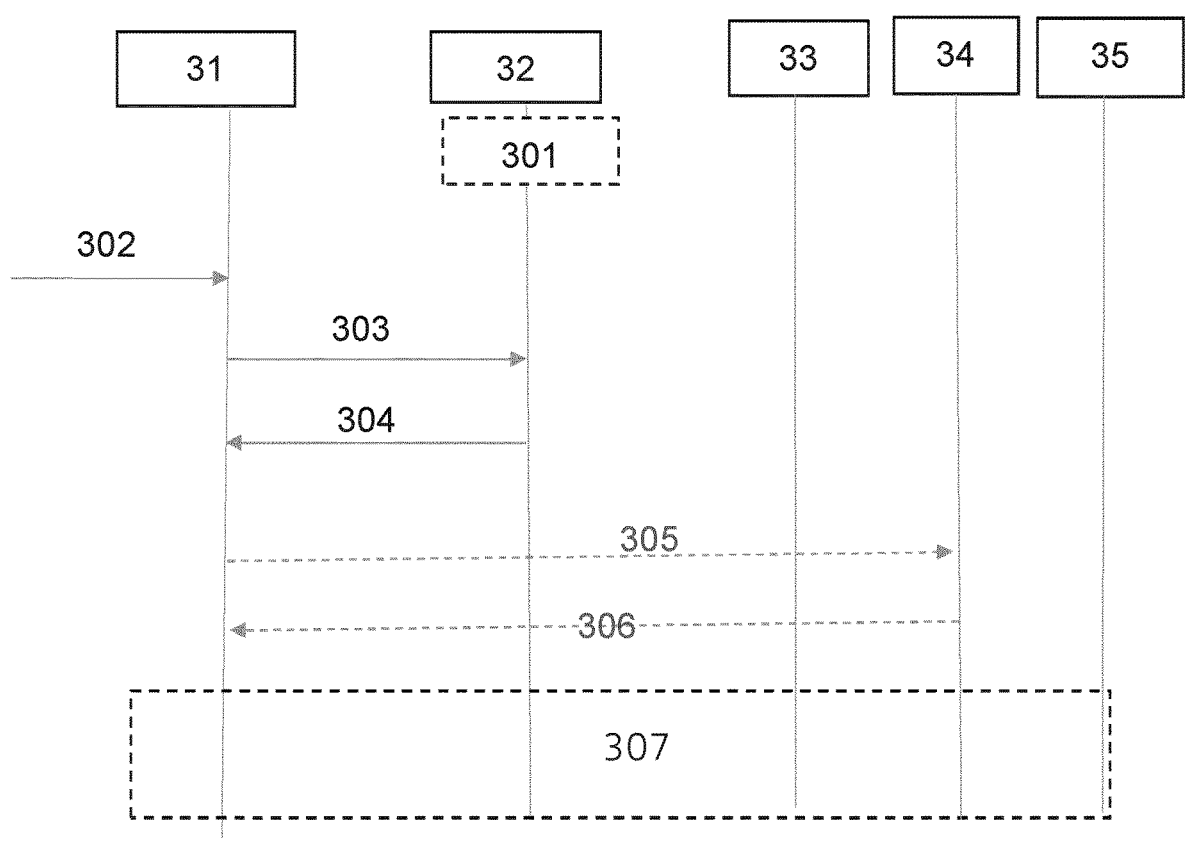
FIGS. 3 to 9 show signalling diagrams illustrating the provision of analytics information.

This is illustrated with respect to the signalling diagram of FIG. 3.

FIG. 3 shows a target AMF 31, a source AMF 32, an SMF 33, a UDSF 34 and other network functions 35.

At 301, the source AMF 32 has available UE analytics information. This UE analytics information may have been received from an NWDAF (not shown) or from another AMF. The NWDAF may be co-located with the source AMF 32. The NWDAF may be separate from the source AMF 32. When the NWDAF is separate from the source AMF 32, the UE analytics information may be received using defined Nnwdaf service interface. How the analytics information has been made available at the source AMF 32 has no impact on the later signalling procedures (for both this example and later examples).

At 302, the target AMF 31 receives a UE registration request for causing a UE to be handed over from the source AMF 32 to the target AMF 31.

At 303, the target AMF 31 signals a request to the source AMF 32 indicating in this request that it may support the transfer of UE analytics information. For example, this may be effected by the target AMF 32 sending a request to the source AMF 32 for UE context transfer related to the UE being handed over. In other words, the request for analytics information (and/or the response to such a request) may utilise signalling that was developed to exchange other information. This means that existing signalling may be expanded to transfer analytics information. The target AMF 31 may specify in this request which types of analytics related to the UE that it is interested in receiving.

The request for the analytics may be sent as part of a UE Context Request and Response procedure, such as the "Namf_Communication_UEContextTransfer" Request (currently defined in step 4 of Section 4.2.2.2.2 of 3GPP Technical Specification 23.502 V16.5.0). In other words, the AMFs may use Namf_Communication services for analytics information exchange.

At 304, the source AMF 31 provides a response to the request for network-based analytics 303. This response may be sent as part of a UE context exchange, such as "Namf-_Communication_UEContextTransfer" Response (currently defined in step 5 of Section 4.2.2.2.2 of 3GPP Technical Specification 23.502 V16.5.0). In other words, the AMFs may use Namf_Communication services for analytics information exchange.

The analytics information provided may be, for example, UE mobility, UE communication pattern analytics, UE behaviour information, etc., such as the analytics information discussed above. When the received request 303 specifies a type of information, the response at 304 may comprise that specified type of information. When the received request does not specify a type of information, the source AMF 31 may make a decision on what analytics information to send. The decision may be to send all of the available analytics information. The decision may be to only send a subset of all of the available analytics information.

The analytics information may be provided together with information usable to determine a freshness level/age for that information, e.g. a confidence level, and timestamp (or counter or sequence number). Such values may be provided, for example, to indicate the freshness or the latest version of analytics information, a validity duration of the analytics information being provided and so on.

Table 1 provides an example of the type of information that may be sent to a NF receiving analytics information from another network function. In this case, analytics information, along with freshness and validity information, is sent together with UE context data. At least the last seven fields may be new fields over currently defined information. This information may be provided as part of Mobility Registration Update procedure as highlighted in FIG. 3. This information may also be provided as part of the Handover procedure discussed in relation to FIG. 4.

TABLE 1

| Field | Description |
| --- | --- |
| SUPI | SUPI (Subscription Permanent Identifier) is the subscriber's permanent identity in 5GS. |
| Routing Indicator | UE's Routing Indicator that allows together with SUCI/SUPI Home Network Identifier to route network signalling to AUSF and UDM instances capable to serve the subscriber |
| AUSF Group ID | The AUSF Group ID for the given UE. |
| UDM Group ID | The UDM Group ID for the UE. |
| PCF Group ID | The PCF Group ID for the UE. |
| SUPI-unauthenticated-indicator | This indicates whether the SUPI is unauthenticated. |
| GPSI | The GPSI(s) of the UE. The presence is dictated by its storage in the UDM. |
| 5G-GUTI | 5G Globally Unique Temporary Identifier. |
| PEI | Mobile Equipment Identity |
| Internal Group ID-list | List of the subscribed internal group(s) that the UE belongs to. |
| UE Specific DRX Parameters | UE specific DRX parameters. |
| UE MM Network Capability | Indicates the UE MM network capabilities. |
| 5GMM Capability | Includes other UE capabilities related to 5GC or interworking with EPS. |
| . . . | . . . |
| UE Mobility analytics | UE analytics information generated e.g. either due to collocated NWDAF with AMF or based on prior request using Nnwdaf services |
| UE Communication pattern analytics | It will include analytics ID and analytics result |
| Expected UE Behaviour analytics (e.g. DL/UP Traffic, etc.) | |

TABLE 1-continued

| Field | Description |
| --- | --- |
| Abnormal UE behaviour analytics | |
| UE analytics Freshness | Timestamp, counter value or sequence number indicating freshness and/or latest version of the generated analytics information |
| Analytics information validity period | Indicates how long the analytics information is valid for usage |
| Analytics Confidence level | Confidence level of the analytics info based on e.g. registration and updates timing. |
| . . . | . . . |

The type of analytics being shown in the table (UE Mobility analytics, Abnormal UE behaviour analytics, Expected UE Behaviour analytics (e.g. DL/UP Traffic, etc.)) are just example and do not limit the types of analytics that can be exchanged via this mechanism Although not shown in FIG. 3, receipt of this analytics information may be then used by target AMF 31. For example, the information may be used to select configurations to optimise communications between the UE and the target AMF 31, such as by selecting the most suitable NFs, appropriate network slice, paging optimizations and so on for communications with the UE. This additionally helps the target AMF 31 avoid any need to wait for reception of analytics output from Nnwdaf and/or avoid any possible re-selection of NFs at a later point of time e.g. after using Nnwdaf interface, etc., as the NWDAF information has already been provided to the target AMF 31 from the source AMF 32.

The freshness level/age information may also be used by the target AMF 31 to determine whether and how to use the analytics information or to discard the analytics information. In particular, the freshness level/age information may be used to determine a time period for which the analytics data is considered relevant. When the time period has expired, the analytics information is discarded by the target AMF 31. Before the time period has expired, the analytics information is used by the target AMF 31.

FIG. 3 shows another example of how target AMF 31 may obtain analytics information. This may be performed in addition to the steps outlined above in 301 to 304. The following steps of FIG. 3 may be performed irrespective of whether or not the steps outlined in 301 to 304 are performed. This procedure may be performed when, for example, the UE's globally unique identifier (e.g. a 5G-GUTI) was included in a Registration Request sent to a serving AMF, the serving AMF has changed since the last Registration procedure, and an unstructured data function (UDSF) is deployed for storing context data that may be retrieved by an AMF, In this example, at 305 the target AMF 31 sends a request for the for effecting the transfer of UE analytics information transfer to UDSF 34 . . . . This may be effected by the target AMF 32 sending a request to UDSF 34 for UE context transfer. This request may be as part of the message defined as "Nudsf_UnstructuredDataManagement_Query" in current 3GPP specifications. In this case, the target AMF requests that the UDSF 34 provides the stored UE's Subscription Permanent Identifier (SUPI) and UE context along with analytics information such as UE Mobility analytics and UE behaviour analytics.

At 306, the UDSF 34 responds to the request of 305 with the requested analytics. At 307 signalling between network entities such as the target AMF 31, the source AMF 32, the SMF 33, the UDSF 34 and other network functions 35 may proceed/continue in accordance with defined procedures.

Not shown in FIG. 3 is the scenario in which the analytics information is provided to the target AMF 31 by the source AMF 32 without the target AMF 31 explicitly indicating its willingness to receive any UE analytics information. In this case, the source AMF 32 may send the target AMF 31 UE analytics information as part of UE context information, such as the message currently defined as "Namf_Communication_UEContextTransfer" Response in 3GPP specifications. For example, the target AMF 31 may indicate its support to receive analytics information by publishing this capability via the NRF. The source AMF 32 may use this NRF-stored information before transferring the analytics to the new AMF. Another example of this unprompted transfer of analytics information is discussed later.

Figure 4:
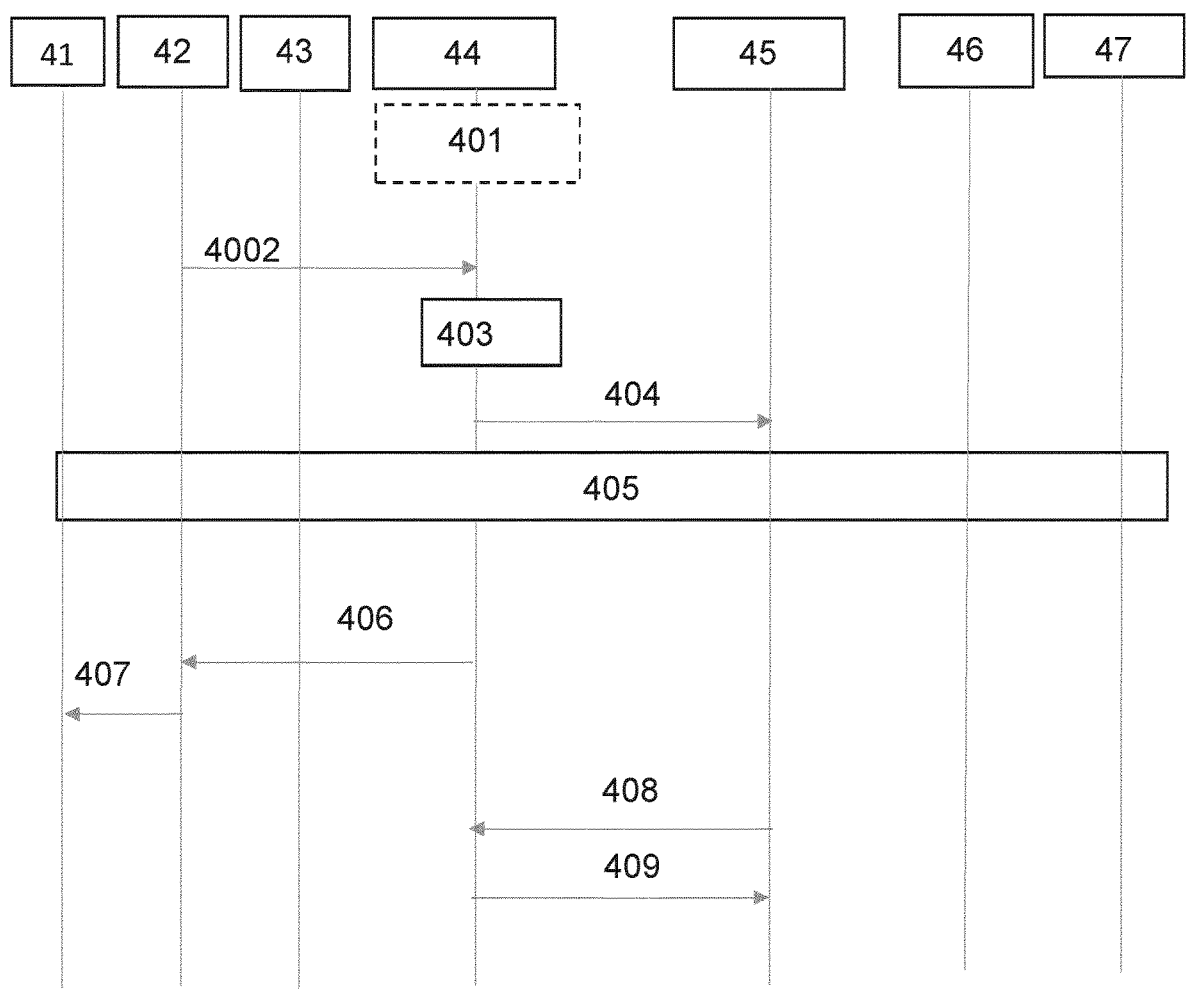

FIG. 4 provides another example signalling diagram. In this example, the UE analytics information relating to a UE 41 is transferred from a source AMF 44 to a target AMF 45 as part of a Handover procedure. Also shown are source-radio access network (S-RAN) 42, target-radio access network (T-RAN) 43, SMF 46 and NFs 47. The target AMF may have, when it registered onto the NRF, indicated whether or not it supports analytics information transfer, and via what form of signalling This information may be stored as part of the profile of the target AMF 45. Therefore the profile of the target AMF 45 may comprise information indicating at least one type of message through which the target AMF 45 can receive the analytics information (e.g. in the present case, the information may be provided as part of Namf_Communication_CreateUEContext Request in UE context setup).

At 401, the source AMF 44 has UE analytics information relating to UE 41 available. This may be provided to the source AMF 44 as described in relation to 301.

At 402, the SRAN 42 sends the source AMF 44 an indication that a handover is required for the UE 41.

At 403, the source AMF 44 selects a target AMF 45 for the handover.

At 404, the source AMF 44 signals the target AMF 45 to request that a UE context be created providing the UE context information. A UE context information comprises UE-specific information, such as defined in Table 1 and may thus include the newly defined 7 last fields of information related with analytics information. This signalling may comprise at least some of the UE analytics information available at 401. The analytics information provided may be, for example, UE mobility, UE communication pattern analytics, UE behaviour information, etc. As mentioned above, it is understood that these mentioned analytics information types are just example and do not limit the types of analytics that can be exchanged via the presently described mechanism. Prior to sending this information, the source AMF 44 may determine that the target AMF 45 may receive the UE analytics information and via what type of signalling. This information may be obtained from the NRF.

The analytics information may be provided together with information usable to determine a trust level for that information, e.g. a confidence level, and the freshness/age of that analytics information, e.g. a timestamp or counter value or sequence number that indicates the freshness of analytics information, validity duration of the analytics information being provided, version of the analytics information and so on.

By providing the analytic information proactively, the target AMF may, for example, be able to better prepare resources for the UE and also to provide the relevant information to T-RAN 45 for when the UE is handed over (e.g. for use during handover execution phase).

Table 1 (above) shows an example of the type of analytics information that might be provided during Handover, with the last 7 fields being new over current handover messages. This analytics information may be sent together with UE context data as part of the Handover procedure highlighted in FIG. 4.

The rest of the UE context request may be as defined in the relevant specifications. For example, as per the message defined in step 3 of 3GPP Technical Specification 23.502 V16.5.0 in FIG. 4.9.1.3.2-1.

After 404, the Handover procedure may proceed as per 3GPP specifications. For example, currently, at 405 the target AMF 45 may respond to the create context message of 404. This message may be a Namf_Communication_CreateUEContext response.

At 406, the source AMF 44 sends a Handover command to S-RAN 42 in response to the received message of 405. At 407, the S-RAN 42 sends a Handover command to the UE 41 in response to the received message of 406.

At 408, the target AMF 45 sends a notification to the Source AMF 44. This message may be the 3GPP defined Namf_Communication_N2InfoNotify message.

At 409, the source AMF 44 sends an acknowledgement to the target 45 to acknowledge receipt of the notification of 408. This message may be the 3GPP defined Namf_Communication_N2InfoNotify Ack message.

Figure 5:
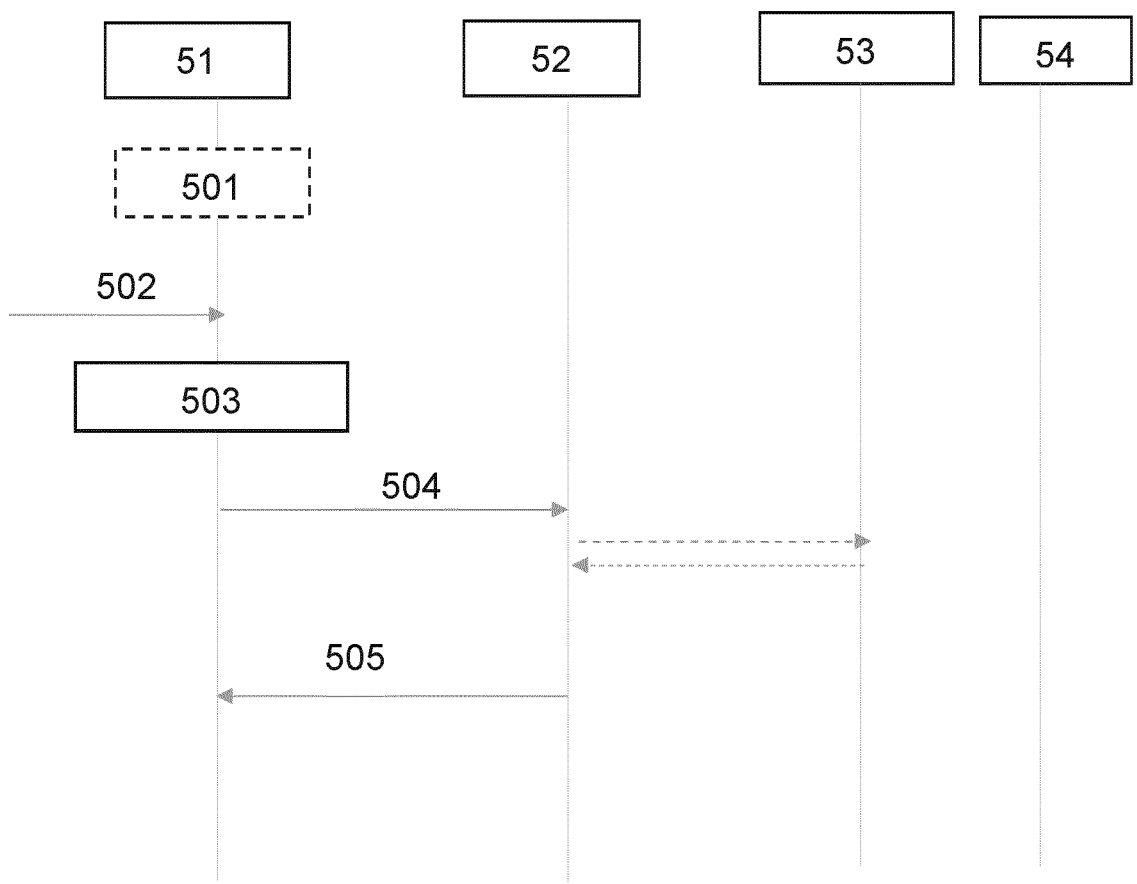

FIG. 5 provides another example signalling diagram. FIG. 5 relates to providing UE analytics information during Protocol Data Unit (PDU) session establishment and/or PDU session update procedures.

FIG. 5 shows signalling between an AMF 51, an SMF 52, a UDM 53 and NFs 54.

At 501, the AMF 51 has UE analytics information available. This information may be as described in relation to 301.

At 502, the AMF 51 receives a request for PDU session establishment and/or PDU session update for a UE associated with at least some of the UE analytics information.

At 503, the AMF 51 selects an SMF 52. This selection may be performed using specification defined mechanisms.

At 504, the AMF 51 signals a session establishment and/or a session update request for the UE to the selected SMF 52. The signalled request may comprise UE analytics information associated with the UE that is the subject of the request. The signalled information may be as described above in relation to step 304, while the process used for signalling the information instead relates to creating and/or updating a session. For example, a Create SM Context Request message using Nsmf_PDUSession service may be used to send the information, such as during step 3 in FIG. 4.3.2.2.1-1 of TS 23.502 V16.5.0. The AMF (or an intermediate SCP (Service Communication Proxy as defined in TS 23.501)) may use information in the SMF profile in the NRF to determine the SMF willingness to receive any UE analytics information The SMF 52 may then use this signalled UE analytics information in further network operations. For example, the information may be used to select, according to selection criteria, the most suitable User Plane Function(s) (e.g. a PDU Session Anchor and/or Uplink CL), Data Network Access Identifier, and so on. The signalled UE analytics information may also help the SMF 52 to potentially avoid any need to wait for reception of analytics output from Nnwdaf services and/or to avoid any possible re-selection of NFs at later point of time e.g. after using Nnwdaf interface, etc. as the SMF 52 would already have been provided with the relevant information.

After exchanging messages with other network entities, such as the UDM 53, at 505 the SMF 52 may respond to the signalled request to acknowledge the request. For example, this response may be an Namf_PDUSession_CreateSMContext response as defined in 3GPP specifications.

Session establishment and/or update may then proceed as defined in an operating communication protocol of the network. One example of this, is as defined in FIG. 4.3.2.2.1-1 of 3GPP Technical Specification TS 23.502 V16.5.0.

Figure 6:
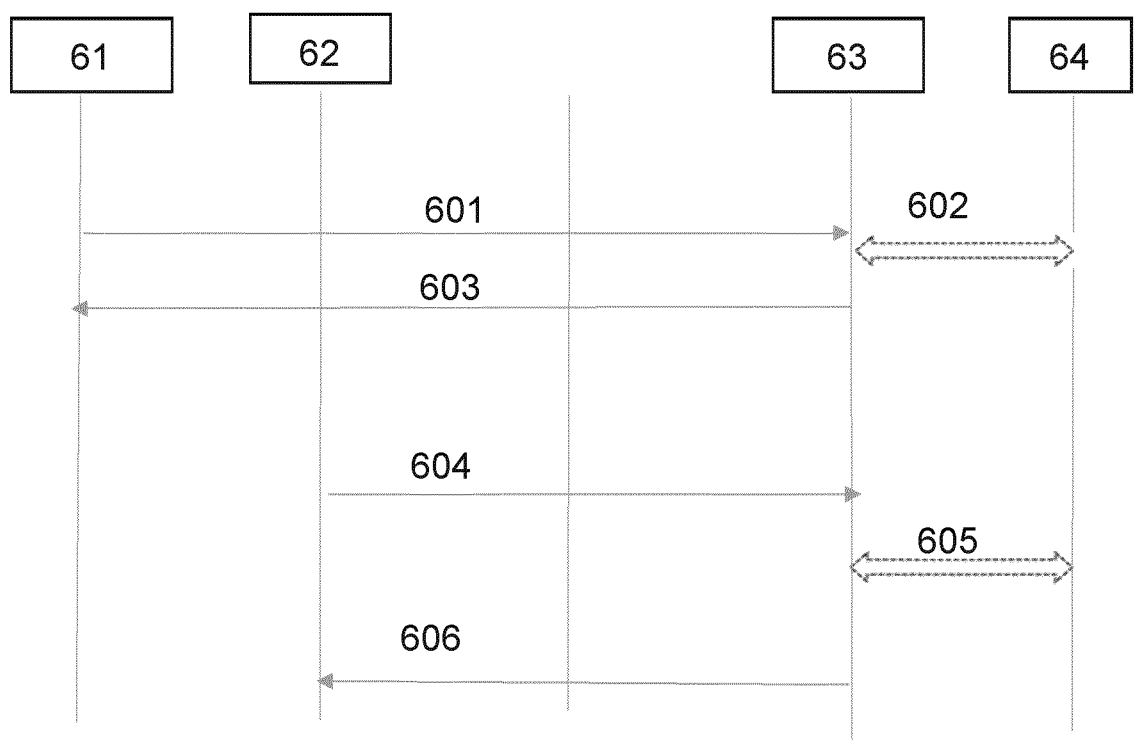

FIG. 6 provides another signalling example. In this example, a UDM may be used for at least one of registering, updating and/or retrieving UE analytics information. Although this example refers to SMFs, it is understood that other network functions, such as AMFs, may also use the presently described techniques. These other 5GC NFs may apply the presently described techniques while using HTTP GET service operation to retrieve UE analytics information.

FIG. 6 shows an old SMF 61, a new SMF 62, a UDM 63 and a UDR 64. The old SMF 61 may have access to UE analytics information, such as discussed in relation to step 504 (or received directly from a NWDAF). For example, UE analytics information may be, for example, UE Mobility analytics and SMF-related analytics (such as UE communication pattern analytics, UE behaviour information (e.g. downlink/uplink traffic pattern, etc.)).

At 601, the old SMF 61 sends a deregistration message to the UDM 63. The deregistration message may comprise UE analytics information accessible by the old SMF 61. This deregistration message may be, for example, an Nudm_UECM_Deregistration message that has been expanded to comprise the UE analytics information. The UE analytics information may be as discussed above (including associated trust/confidence/validity information).

At 602, the UDM 63 may exchange signalling with the UDR 64 to deregister the old SMF 61. This signalling may or may not include the received UE analytics information, depending on where the UE analytics information is to be stored. For example, the UDM 63 may store analytics related information locally. Alternatively, the UDM 63 may store information in UDR 64. In this latter case, the UDM 63 may later make use of Nudr services as specified in 3GPP TS 29.504 and TS 29.505 to retrieve UE analytics information from the UDR following a request (such as discussed later in 604), and to store the retrieved analytics information locally before responding to the request for the UE analytics information.

At 603, the UDM 63 sends a message to the old SMF 61 indicating that the old SMF 61 has been deregistered.

Step 604 may occur, for example, when the UE establishes a new PDU Session and a new SMF 62 (which may be the same SMF as SMF 61) is selected for this new PDU Session; At 604, the new SMF 62 sends a request for subscriber data to the UDM 63, the request relating to the UE. For example, this message may be an Nudm_SDM_Get request. The request for subscriber data may include an explicit request for at least some of the UE analytics information sent to the UDM 63 in step 601. For example, the Nudm_SDM_Get request may be expanded to include the explicit request.

At 605, the UDM 63 exchanges signalling with the UDR 64 to get subscriber data relating to the UE. The signalling may also be used to get SMF related analytics data related with the UE that had been stored in the UDR.

At 606, the UDM 63 signals the new SMF 62 to provide the information requested by the UDM. For example, this message may be an Nudm_SDM_Get response. This signalling in 606 may comprise at least some of the UE analytics information requested in 604. For example, the Nudm_SDM_uGet response may be expanded to comprise at least some of the UE analytics information.

This technique may be useful in a variety of different situations. For example, a UE may be deregistered when a user enters a theatre. The same UE is often re-registered at the same AMF when the user leaves the theatre. That AMF may have kept the UE context, including associated analytics context. However, as PDU Sessions are released when the UE is deregistered, the SMF loses the UE context and their associated analytics context. By storing the analytics context in the UDM and/or the UDR, a new SMF (selected when the UE reregisters) may recover the UE analytics known by the (previous) SMF that last handled the old PDU Session for a user.

Figure 7:
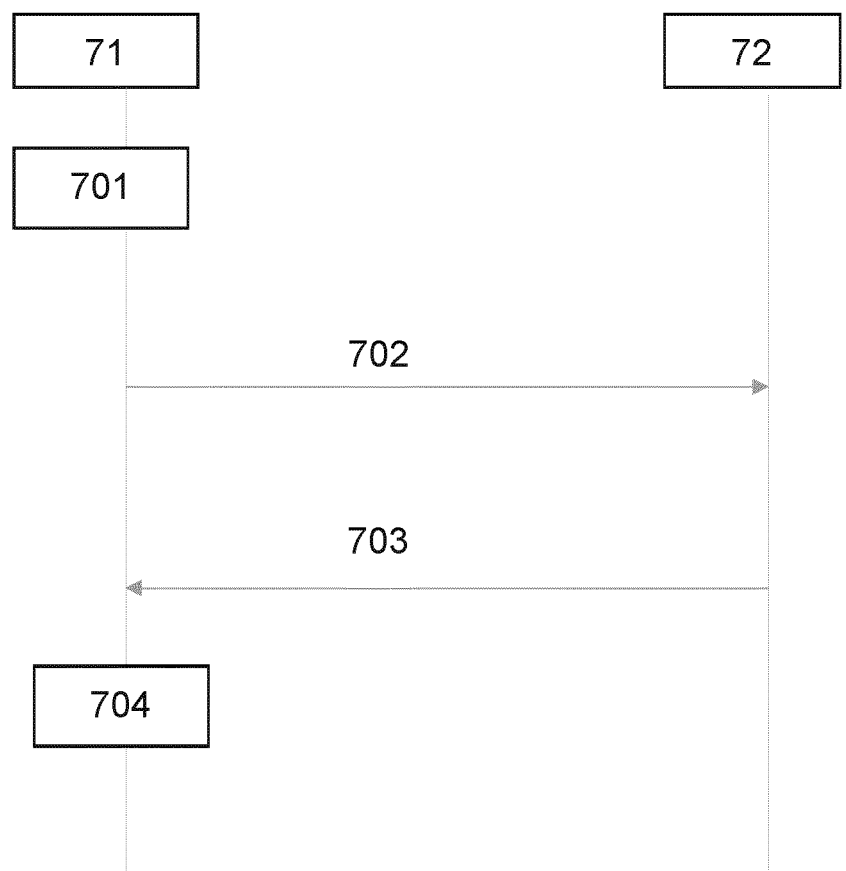

FIG. 7 is another example signalling diagram. FIG. 7 relates to operations that may be performed during Access Management policy association establishment and/or modification procedures.

FIG. 7 shows signalling between an AMF 71 and a PCF 72. The AMF 71 has access to UE analytics information relating to at least one UE. The UE analytics information may be as described above in relation to step 301. The UE analytics information may (or may not) comprise confidence, trust and/or validity related information, as described above.

At 701, the AMF 71 decides to create and/or update an AM policy association for a UE.

At 702, the AMF sends a request to create and/or update an AM policy association for a UE to the PCF 72. This request may include UE analytics information, as described above in relation to step 301. Therefore, this information may comprise, for example, UE analytics ID(s), analytics outputs, predictions, confidence values, corresponding timestamps (or counter value or sequence number), etc. in order to e.g. indicate the freshness of analytics information, validity duration of the analytics information being provided, etc. Using current terminology, this request may be performed by an Npcf_AMPolicyControl_Create/Update policy association request that has been expanded to comprise such analytics-related information. The AMF or an intermediate SCP (Service Communication Proxy as defined in TS 23.501) may use information stored in the PCF profile in NRF to decide whether to send analytics information to the PCF;

The PCF 72 may use this information to create and/or update the policy association. At 703, the PCF 72 may respond to the request to confirm receipt and/or to confirm the policy association. Using current terminology, this response may be an Npcf_AMPolicyControl_Create/Update response.

At 704, after receipt of the response sent at 703, the AMF may deploy Access and mobility control procedures.

Figure 8:
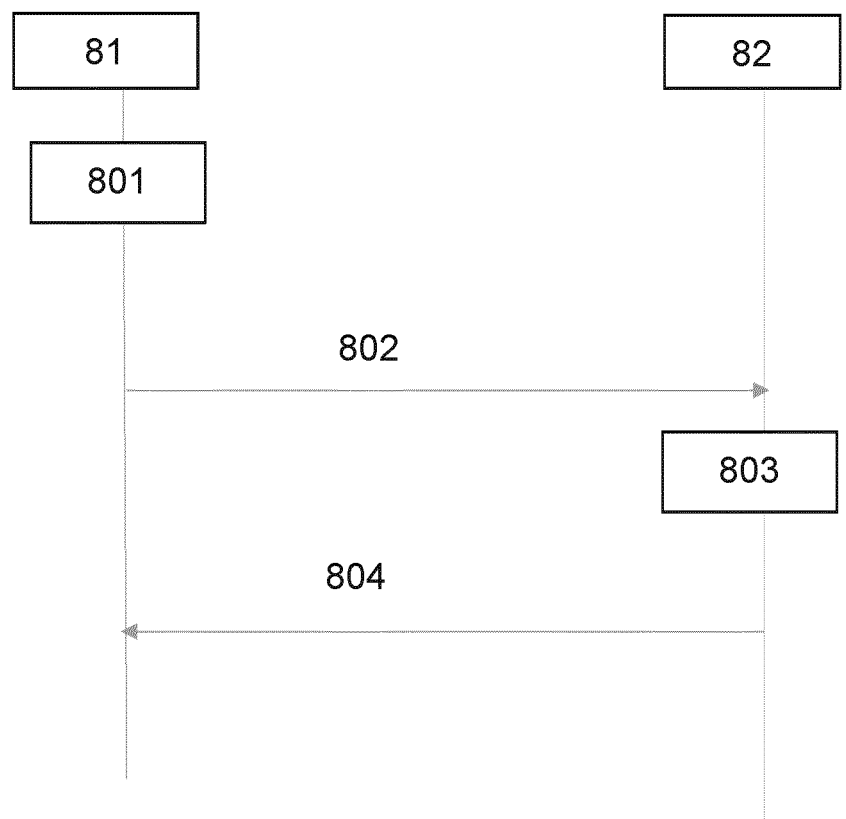

FIG. 8 is another example signalling diagram. FIG. 8 relates to operations that may be performed during Session Management policy association establishment and/or modification procedures.

FIG. 8 shows signalling between an SMF 81 and a PCF 82 . . . . The SMF 81 has access to UE analytics information relating to at least one UE. The UE analytics information may be as described above in relation to step 301. The UE analytics information may (or may not) comprise freshness level/age information, such as confidence, trust and/or validity related information, as described above.

At 801, the SMF 81 decides to create and/or update an SM policy association for a UE.

At 802, the SMF sends a request to create and/or update an SM policy association for a UE to the PCF 82. This request may include UE analytics information, as described above in relation to step 301. Therefore, this information may comprise, for example, UE analytics ID(s), analytics outputs, predictions, freshness level/age information, confidence values, corresponding timestamps (or counter value or sequence number), etc. in order to e.g. indicate the freshness of analytics information, validity duration of the analytics information being provided, etc. Using current terminology, this request may be performed by an Npcf_SMPolicyControl_Create/Update policy association request that has been expanded to comprise such analytics-related information. The SMF or an intermediate SCP (Service Communication Proxy as defined in TS 23.501) may use information stored in the PCF profile in NRF to decide whether to send analytics information to the PCF;

The PCF 82 may use this information to create and/or update the policy association at 803. At 804, the PCF 82 may respond to the request to confirm receipt and/or to confirm the policy association. Using current terminology, this response may be an Npcf_SMPolicyControl_Create/Update response.

Figure 9:
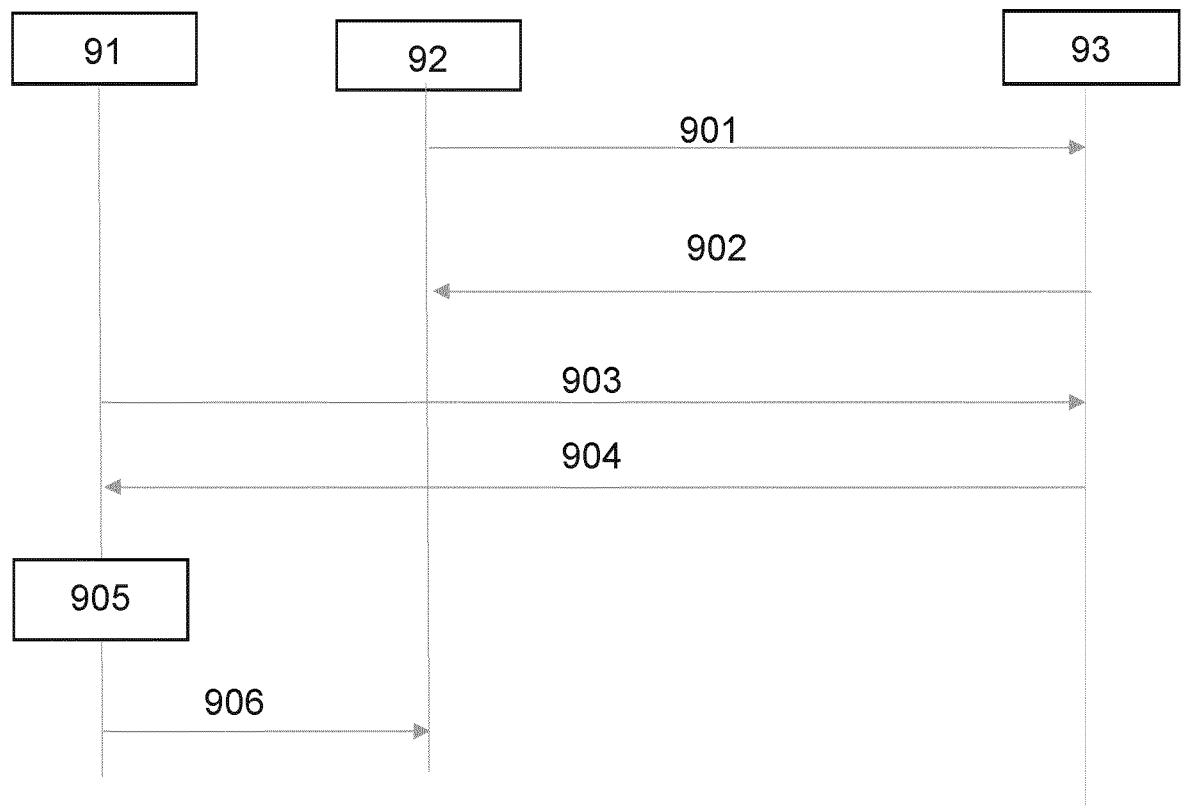

FIG. 9 is another signalling example in which analytics information is transmitted/received through SBI signalling. FIG. 9 is combinable with the signalling of any of FIGS. 3 to 8, and may be used by a network function to publish that network function's capability to receive UE analytics information. For example, the present example illustrates how a network function may indicate that it can receive analytic data (potentially indicating the type of analytics information it can receive and/or any available metadata about the analytics information e.g. freshness level/age information, confidence, etc.), and/or the signalling by which the analytic data may be received.

FIG. 9 shows an AMF 91, an SMF 92, and an NRF 93 In this example, the AMF 91 has UE analytics information accessible to it, as described above in relation to 301. This UE analytics information may also include information related to it, such as freshness level/age information, confidence values, time stamps (or counter values or sequence number), etc., as described in the above examples. It is understood that although SMF 92 is discussed in this example, that any other network Function (such as PCF or UDM) may act as described for the SMF 92 in this Figure.

At 901, the SMF 92 sends a Network Function registration message to the NRF 93. This information may include an indication that the SMF 92 can receive UE analytics information from other network functions, such as from CN network functions. The network function may be a network function other than the network function that generates/produces the UE analytics information. This information may also indicate a form in which the SMF may receive the information, such as the type of messages the SMF 92 can receive the information in. For example, using an expanded version of an Nnrf_NFRegistration message that includes an NF profile for the SMF 92, the SMF may also include the fields SupportingReceivingAnalytics (SMF (Nsmf_P-DUSession_UpdateSMContext Request, Nudm_UECM_Registration Response). The registration message may use a flag to explicitly indicate that the SMF 92 can receive UE analytics information from other network functions. For example, the SMF NfProfile/NFService profile (as defined in 3GPP TS 29.510) indicates a list of services and their Application Programming Interfaces (requests and/or responses) over which the NF/the NF service is willing to receive analytics information. This list may be organized by NF Type (as identified in 3GPP TS 29.510). The SMF NfProfile/NFService profile may support a new flag that indicates that the SMF 92 supports reception of analytics information in operations of Nsmf_PDUSession service.

At 902, the NRF 93 responds to the SMF 92 to inform the SMF that its profile has been created.

At 903, the AMF 91 may send a discovery message to the NRF 93 to discover an SMF. Under current specifications, this may be performed using an Nnrf_NFDiscovery Request message indicating SMF as NF Type.

At 904, the NRF 93 responds to the discovery message by sending details of the SMF 92, including the profile for the SMF. This response may be expanded over the currently defined response to include any indication described above as part of interaction 901 such as that the SMF 92 may receive UE analytics information from other entities than NWDAF.

At 905, the AMF 91 may use this information received during 904 to decide to send UE analytics information to the SMF 92. This received information may also be used to determine a signalling mechanism by which the UE analytics information may be sent.

At 906, the AMF 91 sends UE analytics information (including or not including associated freshness level/age information, such as confidence/trust/validity information for that UE analytics information) to the SMF 92. Using current terminology in 3GPP specifications, this analytics information may be sent in an expanded version of Nsmf_P-DUSession_UpdateSMContext Request, as this is a message indicated as being allowed in the above example of 902 and 904.

The above examples illustrate how any existing or future Service based Interface (SBI) request and response messages (which are for operations not primarily defined for analytics purpose) can also contains analytics information. These analytics information may be made available due to co-located NWDAF and/or collected from a separate/distinct NWDAF before using the SBI messages to distribute the analytics information. Those NF(s) which support receiving these analytics via existing signalling may publish this capability via NRF and/or explicitly request these analytics when they initiate the UE related interaction with the NF that currently maintains these analytics. This means that a source NF may become aware of which NF(s) would like analytics information before transferring any analytics information to at least one other NF. Also, by relying on a receiving NF to indicate when they can receive analytics information (either implicitly through capability publication or through an explicit and direct request to the sending NF), analytics information is not sent to NFs that do not want to receive it. This means that the load over the service interface and messaging may be kept down.

The analytics output data or information i.e. statistics and predictions may be included and sent along with existing UE Context transfer messages. Alternatively, only analytics IDs are sent, with an Analytics ID indicating a type of analytics (such as, for example, UE mobility). An example form of Analytics ID is currently defined in 3GPP TS 23.288. As discussed in the above examples, analytics information transferred to NFs may be associated with at least one timestamp value, counter value or sequence number indicating the freshness and/or latest version of the generated analytics information. This may be useful to support cases in which a NF (e.g. a UDM) receives the same information multiple times or from multiple sources. The receiving NF may use this indication of freshness to determine whether or not to use and/or discard the received analytics information. The transmitting NF may use this indication to determine whether or not to send and/or discard the analytics information to another NF. The usage, and/or transmittal, and/or discarding of data may be performed following the derivation of a time period for this purpose from the timestamp or an additional "analytics information validity period" indication.

Figure 10:
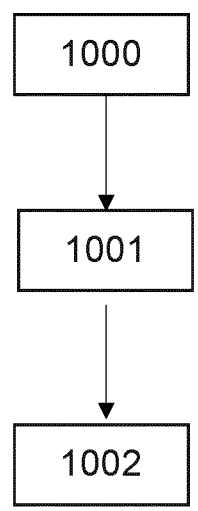
FIGS. 10 and 11 are flow diagrams showing potential operations by network apparatuses.

The following will discuss potential operations of the sending and receiving network functions in relation to the flow charts of FIGS. 9 and 10.

FIG. 10 is a flow chart illustrating potential operations of a network function that comprises analytics information received from another entity, such as a NWDAF. The analytics information/data may be network-based analytics and/or user equipment-based analytics.

At 1000, network apparatus receives analytics data from a first network apparatus. The first network apparatus may be an entity configured to compile analytics data/information. The first network apparatus may provide the network apparatus with the analytics data in response to receipt of a request for that information from the network apparatus. The analytics data may relate to at least one terminal At 1001, the network apparatus determines that said analytics data is usable by a second network apparatus. This determination may be performed in dependence on receipt of an indication that the information is usable by the second network apparatus. The indication may be received explicitly. For example, the indication may be received as a direct transmission from the second network apparatus. The indication may be received implicitly. For example, the network apparatus may retrieve this indication from a third network apparatus, such as a network profile entity, where this indication is comprised within a profile for the second network apparatus. The determination may further indicate at least one type of signalling mechanism via which the second network apparatus may receive the analytics data. The means for determining may determine that the second apparatus is, or will be used to provide a service to a terminal associated with the analytics data.

At 1002, the network apparatus sends said analytics data to the second network apparatus in dependence on said means for determining. For example, the sending may be performed using at least one of the signalling mechanisms indicated.

The analytics data may comprise information indicating an age of analytics information comprised within the analytics data. The network apparatus may use this age information to determine whether to transmit or to discard the analytics data. When the network apparatus determines to transmit the information, the analytics data is transmitted in 1003. When the network apparatus determines to discard the information, the analytics data is discarded without being transmitted.

Figure 11:
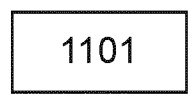

FIG. 11 is a flow diagram indicating potential operations performed by a network apparatus such as the second network apparatus mentioned in connection with FIG. 10. The analytics information/data may be network-based analytics and/or user equipment-based analytics.

At 1101, the network apparatus receives analytics data from a first network apparatus that did not generate said analytics data. The first network apparatus may be as described above in relation to the network apparatus of FIG. 10.

The network apparatus may transmit an indication that the network apparatus can receive analytics data from the first network apparatus. The indication may be received by an entity configured to store profile information for the network apparatus. In this case, the indication may comprise means for creating and/or updating a profile stored in entity to indicate that the network apparatus can receive said analytics data. This profile may be accessible to the first network apparatus, as described above in relation to FIG. 9. The indication may be received by the first network apparatus. In this case, the indication may be a request for said analytics data. The request may be explicit. The indication may indicate through which signalling messages/mechanisms the network apparatus is able to receive said analytics data from the first network apparatus.

The analytics data may comprise information indicating an age of analytics information comprised within the analytics data. The network apparatus may use this age information to determine whether to use or to discard the analytics data. When the network apparatus determines to use the information, the analytics data is used. When the network apparatus determines to discard the information, the analytics data is discarded.

The above described examples have several different advantages. For example, the described techniques may avoid having several NFs request the same analytics information for the same UE or group of UEs from a particular NWDAF. Moreover, on receipt of the analytics information during proposed enhanced procedures such as handover and session reestablishment, target NFs (e.g. AMF, SMF) are able to better prepare resources for the UE being handed over. The target NFs are also able to provide additional analytics-related information to the RAN and/or other NFs, who can in turn use this information to optimise their own communication settings with the UE(s). As an extension to this, Provide analytics information to NFs that do not have access (or easy access) to supporting Nnwdaf services.

Figure 12:
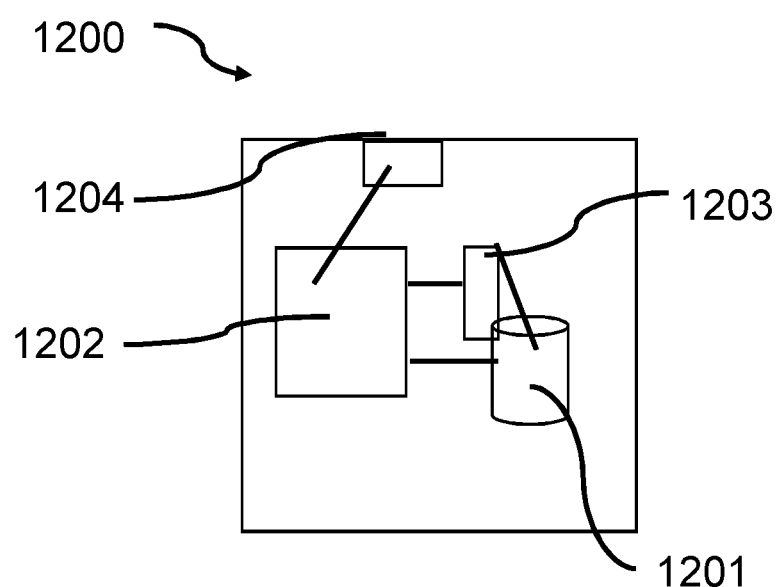
FIG. 12 shows a schematic representation of a network apparatus.

FIG. 12 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 1200 can be arranged to provide control on communications in the service area of the system. The apparatus 1200 comprises at least one memory 1201, at least one data processing unit 1202, 1203 and an input/output interface 1204. Via the interface the control apparatus can be coupled to a receiver and a transmitter of the apparatus. The receiver and/or the transmitter may be implemented as a radio front end or a remote radio head. For example the control apparatus 1200 or processor 1201 can be configured to execute an appropriate software code to provide the control functions.

Figure 13:
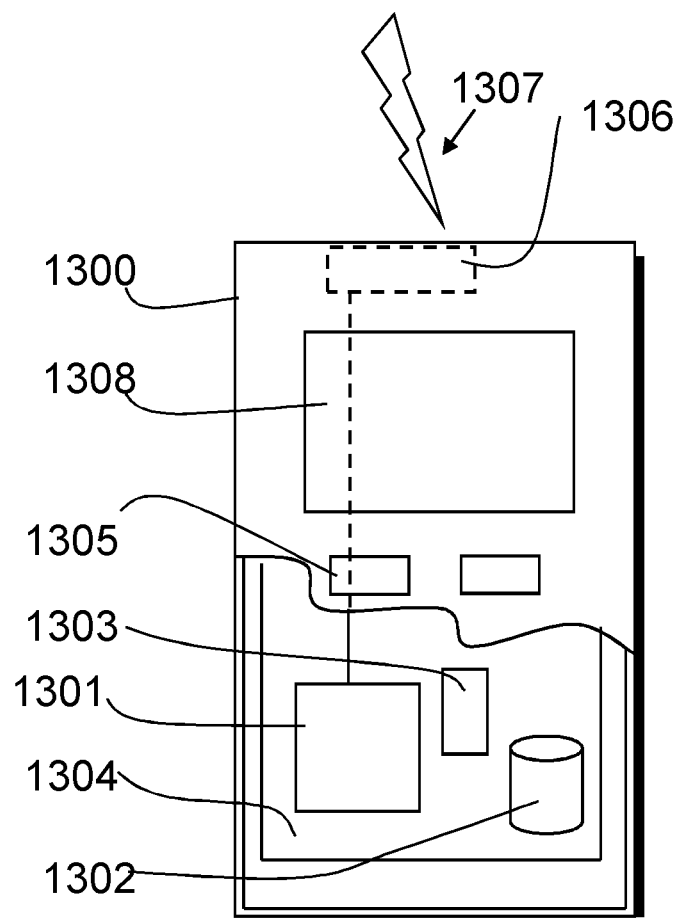
FIG. 13 shows a schematic representation of a user equipment.

A possible wireless communication device will now be described in more detail with reference to FIG. 13 showing a schematic, partially sectioned view of a communication device 1300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 1300 may receive signals over an air or radio interface 1307 via appropriate apparatus for receiving and may transmit signals via appropriate apparatus for transmitting radio signals. In FIG. 13 transceiver apparatus is designated schematically by block 1306. The transceiver apparatus 1306 may be provided for example by means of a radio part and associated antenna arrangement. The antenna arrangement may be arranged internally or externally to the wireless device.

A wireless device is typically provided with at least one data processing entity 1301, at least one memory 1302 and other possible components 1303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 1305, voice commands, touch sensitive screen or pad, combinations thereof or the like. A display 1308, a speaker and a microphone can be also provided. Furthermore, a wireless communication device may comprise appropriate connectors (either wired or wireless) to other devices and/or for connecting external accessories, for example hands-free equipment, thereto.

Figure 14:
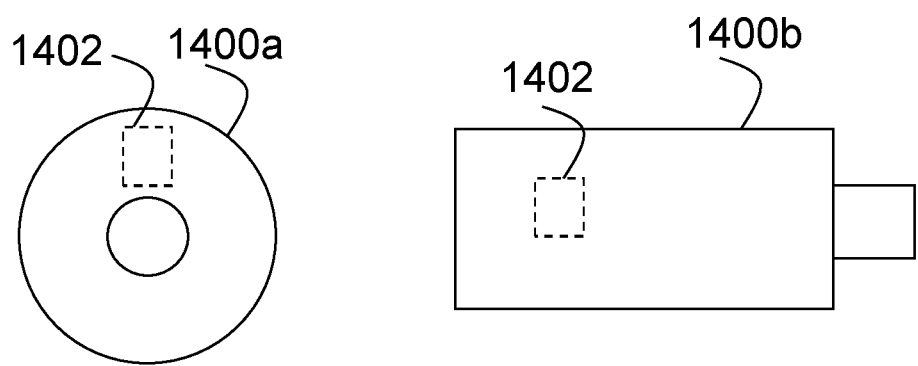
FIG. 14 shows a schematic representation of a non-volatile memory medium storing instructions which when executed by a processor allow a processor to perform one or more of the steps of the methods of some embodiments.

FIG. 14 shows a schematic representation of non-volatile memory media 1400a (e.g. computer disc (CD) or digital versatile disc (DVD)) and 1400b (e.g. universal serial bus (USB) memory stick) storing instructions and/or parameters 1402 which when executed by a processor allow the processor to perform one or more of the steps of the methods of FIGS. 10 to 11.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 10 and 11, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:

(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising:
a source network function;
at least one processor; and
at least one memory storing instructions that, when executed by the at least one processor, cause the source network function at least to:
receive, from a first network apparatus, analytics data related to at least one terminal from a first network apparatus being handed over in an inter-AMF mobility registration update procedure, wherein the analytics data comprises: terminal mobility analytics, terminal communication pattern analytics, terminal behaviour information, and information defining a freshness and a validity of the analytics data;
determine that the analytics data is usable by a target network function by determining, based on a subscription permanent identifier (SUPI) associated with the at least one terminal, that the target network function provides at least one service to the at least one terminal;
determine a signalling mechanism for sending the analytics data to the target network function, wherein determining the signalling mechanism comprises:
sending a discovery request to a Network Repository Function (NRF); and
receiving, from the NRF, a profile of the target network function that defines the signalling mechanism; and
send the analytics data to the target network function using the determined signalling mechanism, the analytics data including the freshness information, validity period, and confidence level using the determined signalling mechanism, wherein the determined signalling mechanism comprising use of an Namf_Communication_UEContextTransfer message.

2. The apparatus as claimed in claim 1, wherein the instructions are further configured to, when executed by the at least one processor, cause the apparatus to;
  receive an indication from the target network function indicating that the analytics data is usable by the target network function; and
  access a network profile of the target network function that indicates that the target network function can receive the analytics data.

3. The apparatus as claimed in claim 2, the analytics data received via an interface other than an Network function to Network Data Analytics Function interface (Nnwdaf) and comprising:
  terminal mobility analytics,
  terminal communication pattern analytics,
  expected terminal behaviour analytics, and
  abnormal terminal behaviour analytics,
  wherein together with freshness information in a form of a timestamp, a validity period indicating how long the analytics data is usable, and a confidence level.

4. A method performed by a source network function, the method comprising:
  receiving analytics data related to at least one terminal from a first network apparatus being handed over in an inter-AMF mobility registration update procedure, wherein the analytics data comprises: terminal mobility analytics, terminal communication pattern analytics, terminal behaviour information, and information defining a freshness and a validity of the analytics data;
  determining that the analytics data is usable by the target network function by determining, based on a subscription permanent identifier (SUPI) associated with the at least one terminal, that the target network function provides at least one service to the at least one terminal;
  determine a signalling mechanism for sending the analytics data to the target network function, wherein determining the signalling mechanism comprises:
    sending a discovery request to a Network Repository Function (NRF); and
    receiving, from the NRF, a profile of the target network function that defines the signalling mechanism;
  determining a signalling mechanism for sending the analytics data to the target network function, wherein the signalling mechanism comprises sending a discovery request to a Network Repository Function (NRF) and receiving a profile of the target network function that defines the signalling mechanism from the NRF; and
  sending the analytics data to the target network function using the determined signalling mechanism, the analytics data including the freshness information, validity period, and confidence level using the determined signalling mechanism, wherein the determined signalling mechanism comprising use of an Namf_Communication_UEContextTransfer message.

\* \* \* \* \*